Oct. 3, 1961 — O. H. BANKER — 3,002,501
REMOTE CONTROL HYDRAULIC SYSTEM WITH EMERGENCY MANUAL CONTROL
Filed Dec. 17, 1959
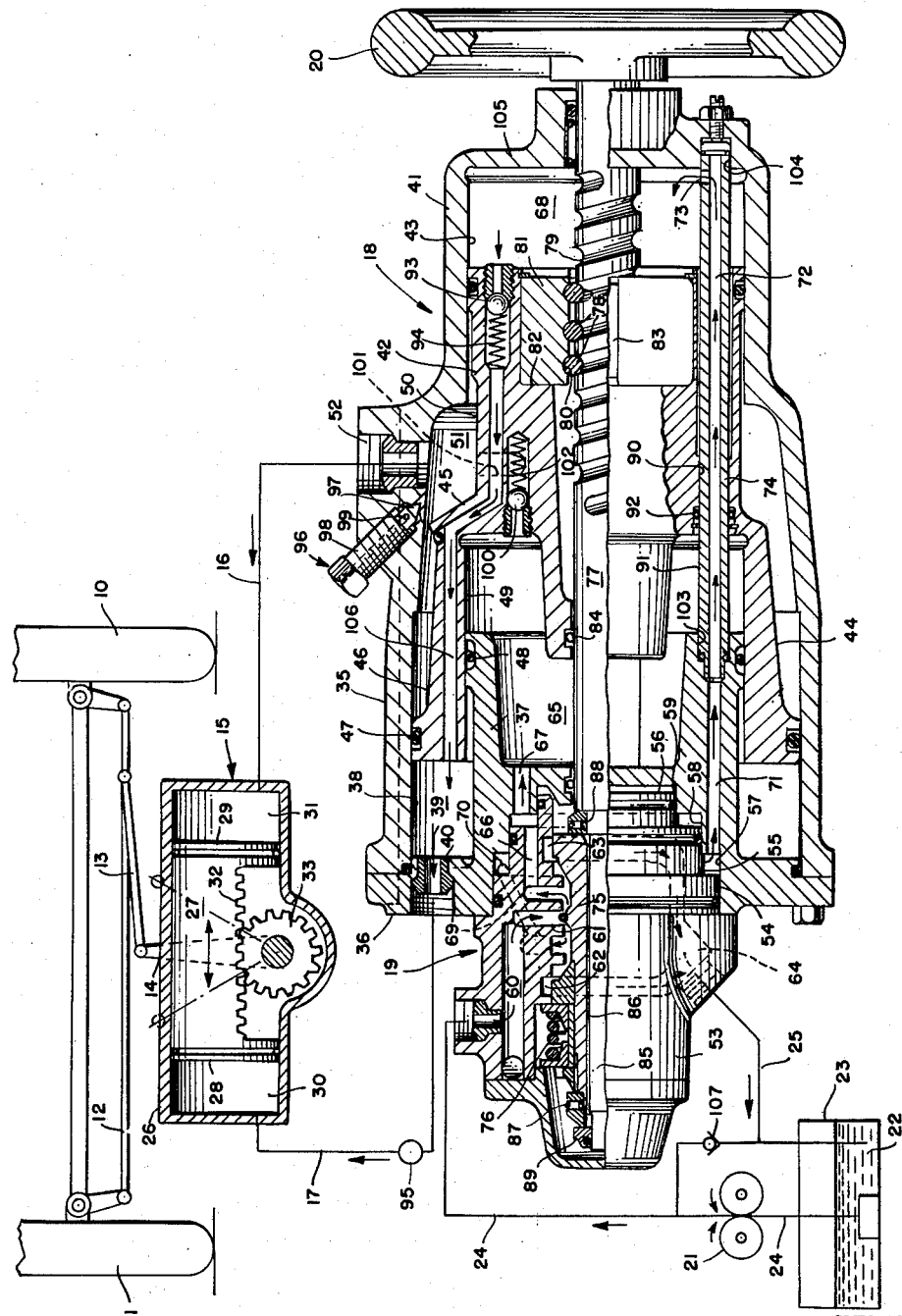
INVENTOR:
OSCAR H. BANKER
BY Charles F. Voytech
ATT'Y

United States Patent Office 3,002,501
Patented Oct. 3, 1961

3,002,501
REMOTE CONTROL HYDRAULIC SYSTEM WITH EMERGENCY MANUAL CONTROL
Oscar H. Banker, Evanston, Ill.
Filed Dec. 17, 1959, Ser. No. 860,164
10 Claims. (Cl. 121—41)

This invention relates to a control device for remote control systems operated by fluid under pressure, and for purposes of illustration will be described with reference to its application to the remote control of steering apparatus for a vehicle. It is understood, however, that the invention is not limited to such application but may be used generally where direct mechanical linkages to move objects at a distance are not feasible.

In controlling the movement of objects at a distance through the use of power operated means, there is always a possibility that the power will fail and control of the remote object will thereby be lost.

It is an object of this invention therefore to provide a remote control for a reciprocable object such as the steering linkage of a vehicle wherein the primary energy for effecting the movement of the steering linkage is supplied by a fluid pressure system, with auxiliary means for effecting the same movement of the remote object, or steering linkage, by a manually operated device in the event the fluid power becomes unavailable.

Where the remote object is a steering linkage for a vehicle, it is highly desirable that the movement of the steering linkage be synchronized with the movement of the master control and, furthermore, that the movement of the linkage be in phase with the movement of the master control. To this end, a further object of this invention is the provision of a master control for a remote motion-producing device wherein the movement of the master control and of the controlled object may be readily brought into synchronism and into a desired phase relation.

A more specific object of this invention is the provision of a master control device for a remote object wherein the master control is operated by a rotatable hand wheel connected thereto by an anti-friction screw device and wherein the same hand-operated wheel is used to operate a valve, which, in turn, controls the application of fluid under pressure to the device operated by the anti-friction screw means so that under normal conditions the force required to turn the wheel is that required to operate a valve, but in the event of a failure of the fluid pressure supply, a greater application of force through the hand wheel will produce the identical result as that produced by the fluid under pressure.

A still more specific object of this invention is the provision of a control valve for a remote control system, which valve may be substantially identical insofar as its major parts are concerned with power steer valves commonly used in automotive vehicles, thereby reducing the cost and complexity of the master control device for the remote control system.

This invention also has within its purview the provision of a remote control for a vehicle steering mechanism wherein both the control and the steering mechanism return to their central positions as a result of the normal caster effect of the vehicle wheels operated by the steering mechanism. Stated more broadly, it is an object of this invention to provide a master and slave hydraulic remote control system wherein the roles of the master and slave components are reversible so that the slave component may dictate to the master component when the latter is inoperative.

A feature of this invention is the provision of a combination of a master control cylinder and a remote slave cylinder with simple and automatic means for initially filling the system between the master and slave cylinders with fluid from a source of fluid under pressure normally used to operate the master cylinders.

A further feature of this invention is the provision of a master piston connected by a screw means to a hand wheel so that the master piston is subject to torque, with guide means fixed to the cylinder for preventing the piston from rotating within the cylinder under the torque impressed thereon by the hand wheel, said guide means being hollow and functioning to conduct fluid under pressure to one side of the master piston.

Other objects and features of this invention will become apparent to those skilled in the art from an examination of the following specification when taken together with the accompanying drawing in which the sole figure is a schematic diagram of a complete remote control system, constructed in accordance with this invention, as applied to the steering linkage of a vehicle, the master control cylinder and the remote device controlled by the master cylinder being shown in longitudinal section.

The steering wheels of the vehicle to be controlled by the remote control system hereinafter to be described are shown at 10 and 11 connected together by a link 12 which, in turn, is connected by a link 13 to a steering arm 14 which is designed to be oscillated by a slave piston and cylinder device 15 to provide the desired steering movement for the wheels 10 and 11. The slave piston and cylinder device 15 is connected through conduits 16 and 17 to a master piston and cylinder device 18, the latter being controlled normally by a valve 19, or alternatively, by a hand wheel 20 which also controls the operation of valve 19. Energy for said master piston and cylinder device is supplied to valve 19 by a pump 20 which draws fluid 22 from a reservoir 23 through a suitable pipe 24 and then forces it through a supply conduit 24 to valve 19. A return or vent passage 25 conducts the spent fluid back to reservoir 23.

Slave piston and cylinder device 15 may be of known construction and may comprise a single cylinder shown schematically at 26 which is closed at both ends and within which is slidably disposed a slave piston 27, said slave piston being double-ended to provide opposed surfaces 28 and 29 upon which fluid under pressure may act. When said piston is centrally located within cylinder 26, left and right hand chambers 30 and 31 respectively (as viewed in the drawing) are formed between the piston and cylinder ends, with surface 28 defining one wall of, and being exposed to, the fluid in chamber 30, and surface 29 similarly forming one wall of, and being exposed to, the fluid pressure in chamber 31.

Movement of piston 27 in cylinder 26 is transmitted to steering arm 14 by a rack 32 formed in the central region of piston 27 and cooperating with a pinion 33 mounted on a shaft 34 to which arm 14 is appropriately secured for rotation or oscillatory movement therewith.

It is understood that instead of a single slave cylinder and piston, two separate cylinders and pistons may be used with an appropriate rigid connection therebetween to compel movement of one piston in unison with the other piston, and with an appropriate connection to steering arm 14.

Master piston and cylinder device 18 may be located at any convenient point on the vehicle without regard to the location of the wheels 10 and 11. The only connection between the master device 18 and the slave device 15 is the conduits 16 and 17 which may be readily formed of brass or flexible tubing to pass around intervening parts of the vehicle. It is only necessary that the conduits 16 and 17 be suitably protected from flying objects such as stones or the like which might tend to rupture said conduits.

Master piston and cylinder device 18 has a housing 35 which may be formed as a cup-shaped casting open at its left hand end as viewed in the drawing, over which is secured a cover plate 36 by bolts or the like. A relatively long axially inwardly extending flange 37 is formed on cover plate 36, said flange being radially inwardly spaced from an internal cylindrical surface 38 formed in housing 35 to provide an annular chamber 39 in housing 35. Said chamber 39 is in direct and continuous communication with conduit 17 through an appropriate pipe fitting 40 secured to, and extending through, cover plate 36. Within a reduced diameter section 41 of housing 35 is disposed a master piston 42, said master piston slidably contacting an interior cylindrical surface 43 in reduced diameter section 41. Master piston 42 has a belled end 44 on its left hand end as viewed in the drawing, said belled end being comprised of a radially extending section 45 and an axially extending section 46, the latter extending into chamber 39 and constituting one of the radial end walls thereof. Said axially extending section 46 is sealed with respect to interior cylindrical surface 38 by a packing 47 and is sealed with respect to the outer surface of flange 37 by a similar packing 48, the latter having a sliding fit with an interior cylindrical surface 49 formed on axially extending flange 46. The diameters of interior cylindrical surfaces 43 and 49 are substantially identical so that the effective outside diameters of the master piston 42 at opposite ends thereof are likewise substantially identical.

An outer surface 50 and the belled end 44 of master piston 42 define with housing 35 a second annular chamber 51, the effective inner diameter of which is that of internal surface 43 and the effective external diameter of which is that of internal cylindrical surface 38, that is to say, the effective inner and outer diameters of chamber 51 are substantially identical with those of chamber 39. Furthermore, the configuration of housing 35 and of belled end 44 of master piston 42 are such as to provide substantially equal volumes for chambers 39 and 51 when master piston 42 is in approximately its middle position with respect to its limits of travel in an axial direction.

Chamber 51 is in continuous communication through a suitable pipe fitting 52 with conduit 16, said pipe fitting being appropriately secured to and passing through housing 35.

Assuming now that there are no leaks in chambers 30 and 31 in the slave piston and cylinder device 15, and in chambers 39 and 51 in master piston and cylinder device 18 and in connecting conduits 16 and 17, it may be apparent that when piston 42 is moved to the left as viewed in the drawing (the system being filled with a fluid), section 46 will advance toward cover plate 36 and force liquid in chamber 39 to pass through conduit 17 into chamber 30, thereby forcing slave piston 27 to the right as viewed in the drawing which, in turn, causes the wheels 10 and 11 to be turned in a manner to turn the associated vehicle to the left, again as viewed in the drawing. While master piston 42 is moving to the left, chamber 51 is expanded to accommodate fluid forced out of chamber 31 in slave cylinder 26 by the movement of slave piston 27 to the right as aforesaid. Conversely, if master piston 42 is moved to the right as viewed in the drawing, belled end 44 will be similarly moved and will cause a reduction in the volume of chamber 51 to force the fluid therein through conduit 16 into chamber 31, which, in turn, causes slave piston 27 to be moved to the left as viewed in the drawing and produce an opposite turning effect in wheels 10 and 11. Fluid in chamber 30 under the latter conditions will be forced out of said chamber through conduit 17 into chamber 39 which is simultaneously being expanded by the movement of belled end 44 to the right.

Thus, it may be apparent that if chambers 30, 31, 39 and 51 and their connecting conduits 16 and 17 are completely filled with an incompressible fluid such as oil, vehicle wheels 10 and 11 may be steered merely by moving master cylinder 42 in housing 35 in the appropriate direction. In accordance with this invention, both a hydraulic and a manual means for moving piston 42 in housing 35 are provided. The hydraulic means will be described first.

Power steering valve 19 is comprised of a housing 53 having three stepped regions, 54, 55 and 56 at one end thereof fitting closely into, and sealed with respect to, corresponding counter bores 57, 58 and 59 respectively in the central region of cover plate 36. A passage 60 in valve housing 53 connects supply conduit 24 to an inlet port 61. Spaced vent ports 62 and 63 are connected by a passage 64 to the return or vent passage 25 leading to the reservoir 23.

Fluid is conducted from inlet port 61 to a chamber 65 on the left hand side of master piston 42 as viewed in the drawing through appropriate passages 66 in valve housing 53, and 67 in cover plate 36. Fluid is conducted from inlet port 61 to a chamber 68 formed in master cylinder housing 35 on the right hand side of master piston 42 as viewed in the drawing through a passage 69 in valve housing 53, an annular passage formed between the valve housing 53 and cover plate 36 by counter bore 57 and designated by the reference character 70, thence through an axial passage 71 in flange 37 of cover plate 36 and then through the interior 72 and a cross bore 73 of a hollow pin 74 passing through an eccentrically located opening 90 in master piston 42. The ends of hollow pin 74 are received in recesses 103 and 104 formed, respectively, in flange 37 and in the closed end 105 of housing 35 and are held therein against both rotative and endwise movement. Fluid under pressure is directed from inlet port 61 to the various passages described above by a spool valve 75 which is axially reciprocable by means hereinafter to be described. The construction of the valve is such as to constitute it an open center valve, and the details of construction of the valve and associated housing may be identical with those of the open center valve disclosed in my U.S. Patent No. 2,879,748, dated March 30, 1959.

Valve 75 is appropriately centered with respect to valve housing 53 by a conventional spring and washer arrangement designated generally by the reference character 76, which coacts with the spool valve 75 and with the housing 53 to maintain the valve in a predetermined position with respect to the housing and hence with respect to the ports therein.

Control of spool valve 75 is effected by slight axial movements of a shaft 77 secured to, and rotatable with, hand wheel 20. At its right hand end as viewed in the drawing, a threaded connection is provided between shaft 77 and master piston 42, said threaded connection being of the anti-friction type and comprising a plurality of balls 78 rolling in a screw thread race 79 formed in the exterior surface of shaft 77, and in a similar screw thread race 80 formed in the interior of an apertured ring 81 axially fixed in a recess 82 in master piston 42 and fixed also against rotation relative to said piston 42 by a key 83. An appropriate seal 84 is provided between shaft 77 and master piston 42 to prevent communication between chambers 65 and 68. Ring 81 is of hardened and ground steel as is also the shaft 77 to minimize wear of the screw thread races 79 and 80 by the balls 78.

At the left hand end of shaft 77 as viewed in the drawing there is formed a reduced diameter section 85 which passes through a bore 86 extending axially through valve 75. Valve 75 is supported on reduced diameter section 85 by end thrust bearings 87 and 88, the whole assembly being axially fixed on shaft 77 by a nut 89. End thrust bearings 87 and 88 are of the anti-friction type so that shaft 77 is free to rotate within spool valve 75, the latter in turn being substantially fixed in an angular direction by the spring and washer arrangement 76 which reacts against valve housing 53.

It may be observed that when shaft 77 is turned by hand wheel 20, it will tend to rotate master piston 42 with it. This rotation, however, is prevented by the pin 74 which passes through opening 90 eccentrically located in master piston 42. The exterior surface 91 of pin 74 is ground smooth to reduce resistance to movement of piston 42 therealong to a minimum, and a seal 92 is provided between surface 91 and master piston 42 to avoid communication between chambers 65 and 68 through opening 90.

Inasmuch as master piston 42 is prevented from rotating by pin 74, the rotation of shaft 72 within master piston 42 would normally tend to move master piston 42 in an axial direction. Such movement, however, is resisted by the fluid in chambers 39 and 51 since a change in volume of either of said chambers 39 or 51 can be effected only by a movement of slave piston 27 which, in turn, can be effected only against the resistance to turning offered by wheels 10 and 11. This resistance is greater than the resistance to axial movement provided by the spring and washer arrangement 76, and hence rotation of shaft 77 results in a slight axial movement thereof and of the spool valve 75 axially fixed thereto. This axial movement of spool valve 75 causes fluid under pressure to be directed into passages 66 or 69, as the case may be, and thence through the connected passages as hereinabove described to chamber 65 or 68. If, for example, shaft 77 is turned clockwise as viewed from the right of the drawing, an axial movement to the left of the shaft and valve will result which will cause valve 75 to close passage 69 to the inlet port 61 and to open passage 66 thereto, thereby admitting fluid under pressure to chamber 65. Piston 42 will thereupon move to the right as viewed in the figure until torque is removed from shaft 77, that is, until the operator ceases to turn wheel 20 in the aforesaid clockwise direction and hold shaft 77 in an axially displaced position.

Movement of master piston 42 to the right as viewed in the drawing will cause fluid in chamber 51 to be expelled through conduit 16 into slave chamber 31. This, in turn, will cause slave piston 27 to be moved to the left as viewed in that drawing and, through the connected steering arm 47 and links 12 and 13, cause wheels 10 and 11 to be turned in a direction to steer the vehicle to the right as viewed in the drawing. Thus, the movement of the wheels is properly coordinated with the movement of the hand wheel 20.

Similarly, rotation of hand wheel 20 in a counterclockwise direction as viewed in the drawing will result in an axial movement of shaft 77 to the right as viewed in the drawing and result in the admission of fluid under pressure to chamber 68. Movement of master piston 42 to the left as viewed in the drawing will ensue and continue as long as torque is applied to shaft 77 in a counterclockwise direction in a sufficient amount to displace shaft 77 axially. Such leftward movement of master piston 42 will force an evacuation of fluid from chamber 39 through conduit 17 into slave chamber 30 and will force slave piston 27 to the right as viewed in the drawing. This movement of the slave piston 27 is transmitted to steering arm 14 and thence through links 12 and 13 to wheels 10 and 11 to cause said wheels to turn in a direction to steer the vehicle to the left, as viewed in the drawing.

It is understood that evacuation of chamber 39, for example, is accompanied by the filling of chamber 51 from the opposite chamber 31 of the slave cylinder 15, and that the volumes of the liquids on both sides of the slave piston 27 and the associated conduits and chambers 39 and 51 are substantially equal so that for each increment of movement of hand wheel 20, a corresponding increment of movement will be effected in the wheels 10 and 11.

The foregoing describes the operation of the master piston 42 by hydraulic power. Should the power for driving pump 21, or the pump 21 itself, fail, such hydraulic power would not be available and the manual operation hereinafter described would then be resorted to.

Assuming that chambers 39, 30, 31 and 51 and their connecting conduits 16 and 17 are filled with fluid, all that is necessary to move slave piston 27 in its cylinder 26 to effect a steering movement of arm 14 is to move belled end 44 of master piston 42 in the appropriate axial direction. With no fluid flowing through valve 19 from pump 21, chambers 65 and 68 on opposite sides of master piston 42 are under atmospheric pressure. Rotation of hand wheel 20 in a clockwise direction as viewed from the right of the drawing, for example, will cause master piston 42 to move to the right in cylinder 35 as viewed in the drawing, thereby forcing any fluid in chamber 68 to be evacuated through the interior 72 of pin 74 and valve 19 to the vent passage 64. At the same time, a check valve 107 (normally submerged in the fluid) in supply conduit 24 from pump 21 will open and allow fluid to enter conduit 24 and pass through spool valve 75 which is shifted under these conditions to the left as viewed in the drawing to allow the incoming fluid to enter passages 66 and 67 and into expanding chamber 65.

The axial movement of master piston 42 causes a corresponding movement of belled end 44 which in turn forces fluid from chamber 51 into conduit 16 and chamber 31 and thus moves slave piston 27 to the left as viewed in the drawing to effect the desired steering movement of vehicle wheels 10 and 11.

Manual operation of hand wheel 20 in the opposite direction from that described above, without the assistance of fluid under pressure, results in a reversal of the fluid movement in chambers 65 and 68, and in a corresponding reversal of the movement of master piston 42, whereupon a reversal of the movement of slave piston 27 and of its connected steering mechanism is effected.

Since the operation of the system hereinabove described is dependent upon chambers 28, 29, 39, 51 and conduits 16 and 17 being completely filled at all times with incompressible fluid, it is necessary to provide means for initially filling the system and subsequently automatically replacing any fluid which might leak from one or the other of the sides of the slave piston 27.

To fill the system initially, the front wheels of the vehicle are raised from the ground so that they swing free and are then allowed to come to rest wherever they will. Next, pump 21 is put into operation and, because valve 75 is of the open center type, fluid will flow freely through the valve and in part into the chambers 65 and 68, complete filling of the chambers 65 and 68 being prevented, however, by any air which might be trapped therein. Hand wheel 20 is then rotated, first to the limit of its movement in a counterclockwise direction and then in the opposite direction to cause piston 42 to expand and contract chambers 65 and 68. After this has been done several times, the greater portion of the air will have been removed from chambers 65 and 68 through the vent passage 64.

To fill chambers 39, 51, 28 and 29 and the conduits 16 and 17, piston 42 is brought to the limit of its movement in one direction or the other, and then hand wheel 20 is rotated in the direction which brought the piston 42 to rest in order to hold valve 75 open. This causes the pressure in the full side, let us say in chamber 68, to approach the pump pressure which may be set at 800 pounds per square inch. Communication is then established from chamber 68 to chamber 39 through a check valve 93, the spring 94 of which may be calibrated at 200 pounds per square inch. Thus, when the pressure in chamber 68 exceeds 200 pounds per square inch, check valve 93 will open and fluid under pressure will then pass by valve 93 and into a passage 106 in master piston 42 and belled end 46 and into chamber 39.

After chamber 39 is filled, the fluid will then continue through conduit 17 into slave cylinder chamber 30 and will gradually fill that chamber, moving piston 27 readily to the right as viewed in the drawing since the vehicle wheels 10 and 11 are off the ground at this stage. The flow of fluid under pressure is allowed to continue into chamber 30 until the pressure therein begins to exceed atmospheric. At that point, a bleed valve shown schematically at 95 and located at the highest point in the system, is opened and is allowed to remain open until fluid unmixed with air flows therethrough, after which the valve is closed. Said bleed valve 95 may be of the type shown at 96 in communication with chamber 51 and is comprised of a conical point 97 acting as the shut-off portion of the valve and a hollow screw 98 which may be integral with point 97, with a cross bore 99 connecting the hollow interior of the screw with the exterior thereof so that fluid may flow past the conical point into the cross bore and out through the hollow section of the screw 96.

After chamber 39, conduit 17 and chamber 30 have been completely filled with fluid, the hand wheel 20 is turned in the opposite direction to move master piston 42 to the right as viewed in the drawing, and when said piston has reached the limit of its movement in that direction and hand wheel 20 is still held in a direction to continue to impose a torque on shaft 77, the fluid pressure in chamber 65 will increase and communication will be established between chamber 65 and chamber 51 by a check valve 100 and a connecting passage 101 to chamber 51. A spring 102, calibrated at approximately 200 pounds per square inch, normally holds check valve 100 closed, but as the pressure in chamber 65 increases and surpasses 200 pounds per square inch, check valve 100 will open and fluid under pressure will then be conducted past the valve through connecting passage 101 into chamber 51 and thence through conduit 16 into slave chamber 31. After the pressure in chamber 51, conduit 16 and chamber 31 exceeds atmospheric, bleed valve 96, which, it will be assumed, is located at the highest point in that system, will be opened and will remain open until fluid unmixed with air passes therethrough, whereupon the valve is closed and chamber 51, conduit 16 and chamber 31 are then assumed to be filled. It will be remembered that when master piston 42 is at its extreme right hand position, slave piston 27 is at its extreme left hand position, both as viewed in the drawing, and hence there is no difficulty in insuring that chamber 51, conduit 16 and chamber 31 will have a correct amount of fluid, i.e., that they will be completely filled.

With both sides of the slave piston 27 completely filled with fluid, any movement of the belled end 46 of master piston 42 will be reflected in a corresponding movement of the slave piston 27. The vehicle wheels may then be lowered to the ground and the system is ready for operation.

Should there be a leak in the chambers connected to either side of slave piston 27 so that one side or the other has less fluid than it should have, it is possible that the turning of the wheels 10 and 11 will not be in phase with the turning of hand wheel 20 as originally set. This condition, however, can be periodically remedied or checked by turning the hand wheel 20 in a given direction until the master piston 42 bottoms on housing 35, or cover plate 36, and then enough torque is impressed on the wheel in the same direction to hold valve 75 open. This will cause the pressure on the working side of piston 42 to increase above 200 pounds per square inch, whereupon fluid will be forced past the check valve into the associated chambers. The continued flow of fluid into the appropriate chamber will force the slave piston to the end of its stroke, and assuming that no air is present in the system, the fluid will then stop flowing. Movement of the hand wheel 20 in the opposite direction will similarly cause the master piston 42 to bottom at the opposite end of its stroke and will cause a similar reversal of movement of the slave piston 27. Any air in the system can be bled off as hereinabove described.

The correct phase relation between hand wheel 20 and vehicle wheels 10 and 11 is restored by continuing to turn the hand wheel 20 after master piston 42 has bottomed so that pressure will build up on the opposite side of the master piston to a point where the corresponding check valve will open and fluid will flow into the slave piston and cylinder arrangement until the slave piston 27 reaches the end of its stroke, whereupon fluid will stop. At this point, both systems are completely filled with fluid and the vehicle wheels have been turned to the limit of their movement when the hand wheel 20 is at the limit of its movement in a given direction. There is now a correct phase relation between the hand wheel 20 and the vehicle wheels 10 and 11 without the necessity of disassembling, adjusting or opening any part of the apparatus.

Valve 19 has been previously described as an "open center" valve. When hand wheel 20 is released, valve 19 assumes the central position shown in the drawing so that there is direct communication from both sides of master piston 45 to the vent passage 64. Thus, should hand wheel 20 be turned to turn vehicle wheels 10 and then released, wheels 10 will tend to return to a forward position because of the caster effect usually built into their supports. This tendency to return will reflect itself as a force tending to move slave piston 27 to a central position in its cylinder. Such movement of slave piston 27 is readily possible since the flow of fluid into chambers 39 and 51 from slave cylinder 15 is not appreciably restricted; master piston 42 can move freely in response to pressure exerted upon belled end 44 because fluid from either side of master piston 42 can escape through open valve 19. The anti-friction balls 78 will spin wheel 20 in a return direction and will cause said wheel 20 to return to the central position ultimately assumed by the vehicle wheels.

Thus it may be apparent that with the use of an open center control valve and with suitable anti-friction screw means at the hand wheel shaft, the functions of the master and slave components are reversible so that hand wheel 20 may control vehicle wheels 10 and 11 during a departure from a straight line movement of the vehicle, and vehicle wheels 10 and 11 may control hand wheel 20 during a return to such straight line movement.

It is understood that the foregoing description is merely illustrative of preferred embodiments of the invention and that the scope of the invention therefore is not to be limited thereto but is to be determined by the appended claims.

I claim:

1. In combination, a housing defining a hydraulic cylinder, a piston mounted for reciprocation within said cylinder, a shaft extending axially through said piston and journalled at one end in the housing for relative axial movement therewith, a threaded connection between the shaft and piston, means limiting axial movement of the shaft relative to the housing, valve means axially fixed to the shaft, said housing having ports the opening and closing of which is controlled by axial movement of the valve on the shaft, means for preventing rotation of the piston in said cylinder, and external means for rotating the shaft in said cylinder, said housing having passages therein connecting said ports to opposite sides respectively of said piston.

2. The combination described in claim 1, said shaft having a smooth cylindrical section adjacent to the threaded connection between the shaft and piston, and seal means interposed between the shaft and piston and cooperating with the said smooth cylindrical section.

3. The combination described in claim 1, said housing defining additionally an annular hydraulic cylinder axially spaced from the first-mentioned hydraulic cylinder, and a piston mounted for reciprocation within said annular cylinder and rigidly connected to said first piston for axial movement therewith.

4. The combination described in claim 1, said housing defining an annular hydraulic cylinder axially spaced from the first cylinder, and said piston having a belled end extending into the annular hydraulic cylinder and comprising an annular piston.

5. The combination described in claim 1, said housing defining an annular hydraulic cylinder axially spaced from the first cylinder, said piston having a belled end extending into the annular hydraulic cylinder and comprising an annular piston, said first-mentioned piston and belled end having passages establishing fluid communication between opposite ends of said first-mentioned piston and annular piston, and check valves in said passages normally closing said passages.

6. The combination described in claim 1, said housing defining an annular hydraulic cylinder axially spaced from the first cylinder, said piston having a belled end extending into the annular hydraulic cylinder and comprising an annular piston, said first-mentioned piston and belled end having passages establishing fluid communications between opposite ends of said first-mentioned piston and annular piston, and check valves in said passages normally closing said passages, said means for preventing rotation of the first-mentioned piston in said cylinder comprising a tube extending eccentrically through said piston and fixed to said housing, said tube forming a part of one of said passages connecting said ports to opposite sides respectively of said piston.

7. In combination, a housing having concentric, axially spaced cylindrical walls therein, a cover plate for one end of the housing having a cylindrical flange extending into the housing in radially spaced relation to one of said cylindrical walls and defining therewith an annular cylinder, a piston in the housing cooperating with the other of said cylindrical walls, said piston having a belled end extending into the annular cylinder and cooperating with the said other of said cylindrical walls and with the cylindrical flange and comprising an annular piston, a valve; a shaft extending through said housing, first-mentioned piston and end cover and connected to said valve; a threaded connection between said shaft and first-mentioned piston, means for preventing rotation of said first-mentioned piston and external means for rotating said shaft, said cover plate and housing having passages therein connecting the valve to opposite sides of said piston, and said shaft and valve having limited axial movement relative to the housing resulting from torque reaction produced by the threaded connection between the shaft and piston whereby to control the opening and closing of said passages by said valve.

8. The combination described in claim 7, said cover plate including a valve housing secured thereto and extending exteriorly of the cover and having passages therein connecting with the said passages in the end cover and housing.

9. The combination described in claim 7, said means for preventing rotation between the first-mentioned piston and the shaft comprising a tube defining a part of the passage in said housing and end cover, said tube extending from the end cover through the first-mentioned piston to the housing and having a radial bore communicating the interior of the tube with one side of said first-mentioned piston.

10. The combination described in claim 7, and means for sealing the first-mentioned piston relative to said shaft.

References Cited in the file of this patent
UNITED STATES PATENTS

| | | |
|---|---|---|
| 2,059,082 | Brady et al. | Oct. 27, 1936 |
| 2,403,325 | Armington | July 2, 1946 |
| 2,607,321 | Lado | Aug. 19, 1952 |
| 2,742,021 | Geyer | Apr. 17, 1956 |
| 2,879,748 | Banker | Mar. 31, 1959 |
| 2,936,739 | Levensteins et al. | May 17, 1960 |